US008153215B1

(12) United States Patent
Peduto et al.

(10) Patent No.: US 8,153,215 B1
(45) Date of Patent: Apr. 10, 2012

(54) MULTILAYER STRUCTURE BASED ON POLYAMIDES AND TUBE OR CONDUIT WITH MULTILAYER STRUCTURE

(75) Inventors: Nicolangelo Peduto, Cesano Maderno (IT); Franco Speroni, Ceriano Laghetto (IT)

(73) Assignee: Nyltech Italia, Ceriano Laghetto (IT)

( * ) Notice: Subject to any disclaimer, the term of this patent is extended or adjusted under 35 U.S.C. 154(b) by 0 days.

(21) Appl. No.: 09/462,179

(22) PCT Filed: Jun. 24, 1998

(86) PCT No.: PCT/EP98/03859
§ 371 (c)(1),
(2), (4) Date: Mar. 10, 2000

(87) PCT Pub. No.: WO99/01280
PCT Pub. Date: Jan. 14, 1999

(30) Foreign Application Priority Data

Jul. 3, 1997 (FR) ....................... 97 08688

(51) Int. Cl.
*B32B 1/08* (2006.01)
*B32B 23/00* (2006.01)
(52) U.S. Cl. ............... 428/35.7; 428/34.1; 428/34.3; 428/34.6; 428/34.7; 428/36.91; 428/36.92; 428/474.9; 138/137
(58) Field of Classification Search ............... 428/34.1, 428/34.3, 34.6, 34.7, 35.7, 36.91, 36.92, 428/474.9; 138/137
See application file for complete search history.

(56) References Cited

U.S. PATENT DOCUMENTS

| 3,920,879 | A | * | 11/1975 | Segal et al. ............. 428/474.9 |
| 4,212,965 | A | * | 7/1980 | Campbell ............. 528/340 |
| 4,535,901 | A | * | 8/1985 | Okudaira et al. ............ 215/12.2 |
| 4,828,915 | A |   | 5/1989 | Schroeder et al. ............ 428/332 |
| 4,881,576 | A | * | 11/1989 | Kitami et al. ............ 138/125 |
| 5,039,786 | A | * | 8/1991 | Pipper et al. ............ 528/324 |
| 5,164,445 | A | * | 11/1992 | Nishida et al. ............ 525/41 |
| 5,219,003 | A |   | 6/1993 | Kerschbaumer ............ 138/137 |
| 5,256,460 | A | * | 10/1993 | Yu ............ 428/36.9 |
| 5,317,059 | A | * | 5/1994 | Chundury et al. ............ 525/66 |
| 5,330,810 | A | * | 7/1994 | Nishino ............ 428/36.91 |
| 5,357,030 | A | * | 10/1994 | VanBuskirk et al. ............ 528/337 |
| 5,425,817 | A | * | 6/1995 | Mugge et al. ............ 138/137 |

FOREIGN PATENT DOCUMENTS

| DE | 1595496 | * | 4/1970 |
| DE | 295 19 867 |   | 3/1997 |
| EP | 0 470 605 |   | 2/1992 |
| EP | 0 527 437 A1 |   | 2/1993 |
| EP | 0646627 | * | 4/1995 |
| GB | 2 048 427 A |   | 12/1980 |

OTHER PUBLICATIONS

Database WPI, Section Ch, Week 9349, Derwent Publications Ltd., London, GB; AN 93-392205, XP002059334 & JP 05 293916 A (Toyota Cent Res & Dev Lab), Nov. 9, 1993.
Database WPI, Section Ch, Week 8504, Derwent Publications Ltd., London, GB; AN 85-021105, XP002059335 & JP 59 215352 A (Ube Ind Ltd), Dec. 5, 1984.
Database WPI, Section Ch, Week 8406, Derwent Publications Ltd., London, GB; AN 84-033512, XP002059336 & JP 58 222849 A (Toray Ind Inc), Dec. 24, 1983, see abstract.

* cited by examiner

*Primary Examiner* — Marc Patterson
(74) *Attorney, Agent, or Firm* — SNR Denton US LLP

(57) ABSTRACT

The invention concerns a multilayer structure based on polyamides, particularly suitable for making tubes or conduits for transporting liquid fluids such as alcohol's, liquid fuels, fuel containing oxygen-containing compounds such as, for example alcohol's or refrigerating fluids. The multilayer structure comprises two superposed layers: at least one internal layer and at least one external layer. The invention is characterized in that at least the internal layer is based a composition comprising at least one thermoplastic polyamide and at least one agent modifying resistance to shocks in a weight proportion between 10 and 50% of said composition, and at least the external layer is based on a composition containing as polymeric matrix a polyamide composition selected among the group comprising: (i) a thermoplastic copolymer obtained by copolymerization of ε-caprolactam with at least one of the monomers selected among the group comprising: an aminoacid containing at least 9 carbon atoms, or the corresponding lactam, a mixture of hexamethylenediamine with a diacid comprising at least 9 carbon atoms, the weight ratio between the ε-caprolactam and the total hexamethylenediamine and diacid and/or aminoacid ranging between 4 and 9, or (ii) a mixture of at least said thermoplastic copolymer and at least a second thermoplastic polyamide or copolyamide obtained by polymerization of monomers containing less than 9 carbon atoms. The weight content of the second polymer or copolymer in the polymeric matrix is between 0 and 80 wt. %, preferably between 0 and 40 wt. %. The multilayer structure has high barrier properties against fuel vapor and good mechanical properties such as good resistance to cracking.

16 Claims, No Drawings

MULTILAYER STRUCTURE BASED ON POLYAMIDES AND TUBE OR CONDUIT WITH MULTILAYER STRUCTURE

The present invention relates to a polyamide-based multilayer structure, suitable in particular for the manufacture of tubes or pipes intended to transport liquid fluids such as alcohols, liquid fuels, fuels which may contain oxygen compounds such as, for example, alcohols or refrigerants.

It relates more particularly to a multilayer structure having improved barrier properties, in particular with respect to the fluids indicated above, and good properties of flexibility and resistance to environment conditions.

The use of tubes and pipes made of plastic for transporting fluids such as fuels in combustion engines is known. For example, tubes or pipes made of polyamide 12 are often used in motor vehicles.

However, the standards governing the construction of vehicles, in particular those attempting to combat the atmospheric pollution generated by these vehicles, are becoming stricter and stricter.

Consequently, tubes or pipes with monolayer structure, for example made of polyamide 12, cannot meet the new specifications relating to fuel vapour emissions in motor vehicles. It is thus becoming very difficult to comply with the standards and requisite characteristics relating to the fuel-vapour barrier property while keeping appropriate mechanical properties, such as flexibility, cracking resistance and dimensional stability.

In order to overcome these drawbacks, tubes or pipes with multilayer structure have been proposed comprising a layer of polyamide, in particular polyamide 11 or 12 and a layer of ethylene/vinyl alcohol copolymer (see patents FR 2 579 290, EP 0 428 834, EP 0 428 833). However, use of these tubes has shown that they cannot comply with all the characteristics required for use in combustion engines.

A multilayer structure has also been proposed comprising a layer of polyamide 11 or 12 as its external layer, and a layer of polyvinylidene fluoride as its internal layer (for example, U.S. Pat. No. 5,284,184). In certain cases, the polyvinylidene fluoride is plasticized with, in particular, a benzene sulphonamide, and in other cases, such as that of the patent above, it is necessary to have a layer for adhesion between the two layers, polyvinylidene fluoride and polyamide. However, as in the previous case, such a structure cannot comply with the characteristics required for its main application, for example fuel pipes of combustion engines. In particular, it has a deficiency in the adhesion between the layers, and therefore a lack of structural cohesion.

In order to improve the adhesion between these layers, and therefore the properties of the multilayer structure overall, it has been proposed to use a polyvinylidene fluoride composition comprising either a glutarimide polymer (EP 0 637 511) or an acrylate copolymer comprising at least anhydride functional groups obtained by cyclization of two neighbouring carboxylic functional groups. However, the adhesion between the various layers of the structure and its mechanical properties become degraded with ageing.

One of the objects of the present invention is to provide a multilayer structure having improved barrier properties and better resistance to environmental conditions, and having a set of mechanical properties suitable for the manufacture or production of pipes or tubes for transporting fluids, in particular hydrocarbon fuels. This composition furthermore has remarkable dimensional stability when it is in contact with fuels of which oxygen is a constitute, such as fuels containing alcohol.

To that end, the invention provides a multilayer structure comprising at least one internal layer and at least one external layer which lie one on top of the other. According to the invention, at least the internal layer is formed from a composition comprising at least one thermoplastic polyamide and at least one impact-resistance modifier present at a concentration by weight of between 10 and 500 of the said composition, and in that at least the external layer is formed from a composition comprising as polymer matrix a polyamide composition selected from the group comprising:

(i) a thermoplastic copolymer obtained by copolymerization of $\epsilon$-caprolactam with at least one of the monomers selected from the group comprising:
  an amino acid comprising at least 9 carbon atoms, or the corresponding lactam
  a mixture of hexamethylenediamine with a diacid comprising at least 9 carbon atoms,
the ratio by weight between the $\epsilon$-caprolactam and the total amount of hexamethylenediamine and diacid and/or the said amino acid being between 4 and 9, or (ii) a mixture of at least the said thermoplastic copolymer and at least one second thermoplastic polyamide or copolyamide obtained by polymerization of monomers comprising fewer than 9 carbon atoms. The content by weight of the second polymer or copolymer in the polymer matrix is between 0 and 80% by weight, preferably between 0 and 40% by weight.

The composition forming the external layer also comprises a impact modifier present at a content by weight of preferably between about 5 and 50% of the thermoplastic composition when the latter contains a mixture of thermoplastic copolymer and a second polyamide according to definition (ii) above.

The structure of the invention has two layers, the polymer matrices of which are based on polymers with similar or even identical chemical structures, making it possible to obtain a good bond between the layers without using an intermediate binding layer. Furthermore, the internal layer has high barrier properties, in particular to the hydrocarbon mixtures used as fuel in internal-combustion engines and very good dimensional stability even in the presence of alcohol compounds which may be present in the fuels mentioned above. This internal layer also gives the structure of the invention high mechanical properties of tensile strength, elongation at break and cold impact strength. The structure of the invention thus has a high degree of resistance to bursting under pressure.

The structure of the invention also has a high degree of resistance to attack by outside conditions, because the external layer has a high degree of resistance to stress cracking in metal halide solutions and, more particularly, the $ZnCl_2$ test, even when the thickness of the layer is small.

Indeed, according to another characteristic of the invention, the thickness of the external layer may be very small, even less than 0.1 mm. The thickness of the external layer is not, however, critical in terms of obtaining the technical result of the invention. It will be dictated by the technical constraints in manufacture of the structure, or by economic constraints. The thickness of the external layer may preferably represent less than 10% of the total thickness of the multilayer structure.

According to one characteristic of the invention, the multilayer structure is in the form of a cylindrical or noncylindrical tubular article. This article is generally manufactured by using a technique of coextruding different compositions. One such technique is, for example, described in European patent 0436923.

In a preferred embodiment of the invention, the articles are pipes or tubes which are used as fuel pipes in internal combustion engines. These articles may also be containers or tanks intended to contain the fuels mentioned above, with the multilayer structure of the invention forming the walls of these vessels.

According to another embodiment of the invention, the multilayer structure of the invention comprises intermediate layers arranged between the internal and external layers described above. Some of these intermediate layers are advantageously formed from a composition identical to the one forming the external layer. These layers will be referred to as external-type intermediate layers. Other intermediate layers are formed from a composition identical to the one forming the internal layer. Such layers will be referred to as internal-type intermediate layers.

Advantageously, the internal-type intermediate layers and the external-type intermediate layers are arranged alternately in the transverse direction of the structure.

Furthermore, without departing from the scope of the invention, the structure may comprise intermediate layers made from a composition other than those used to form the internal and external layers.

In one embodiment of the invention, the multilayer structure may comprise external-type layers as layers exterior to the structure, at least one internal-type intermediate layer being present between these two outer layers. In the preferred configuration of this embodiment, the structure is composed of two outer layers of the external layer type and one intermediate layer of the internal layer type, which will provide the fuel-vapour barrier properties.

The thermoplastic polyamide compositions forming the internal layer and the internal-type intermediate layers advantageously comprise a matrix based on a polyamide thermoplastic polymer and at least one impact-strength modifier present at a concentration by weight of between 10 and 50% of the composition, the modulus of the said composition being less than 1500 MPa, preferably less than 1000 MPa.

The polyamides are present in the composition at a concentration by weight which is advantageously between 55% and 70%.

The preferred polymers are nylon 6,6, nylon 6 or their copolymers, or mixtures of these polyamides with other polyamides.

According to another preferred characteristic of the invention, the composition forming the internal layer comprises, as another component, a chain extender for the polyamide matrix, which is present at a concentration by weight of between 0.05% and 5% of the polyamide matrix.

According to yet another preferred characteristic of the invention, the composition comprises a plasticizer for the polyamide matrix, which is present at a concentration by weight of between 1 and 20%, preferably between 5 and 10% of the said polyamide matrix.

The impact-strength modifier of the composition forming the external layer is advantageously a compound having a Tg below 0° C., and preferably below −20° C. Furthermore, in order to obtain a composition having a very low modulus, for example below 1000 MPa, this compound advantageously has a modulus of less than 200 MPa.

The preferred modifiers of the invention are polyolefins optionally having an elastomeric nature.

According to a preferred characteristic of the invention, at least some of the impact modifiers of the composition comprise polar functional groups capable of reacting with the polyamide. These polar functional groups may, for example, be acid, anhydride, acrylic, methacrylic or epoxy functional groups.

These functional groups are generally grafted onto the compounds' macromolecular chain.

Examples of polyolefins suitable for the invention include polyethylenes, polypropylenes, polybutylenes or copolymers of ethylene and α-olefins such as ethylene/propylene dienes, and copolymers of ethylene and propylene.

Particularly preferred polymers which may be mentioned are ultra-low-density polyethylenes referred to as ULDPEs. These compounds are copolymers of ethylene and α-olefins comprising from 4 to 10 carbon atoms and having a melt flow index (index measured under a load of 2.16 kg at 190° C. according to the ASTM D 1238 standard) of between 0.1 and 7 g/10 min, advantageously between 0.5 and 7 g/10 min, preferably less than 1 g/min, and a density of less than 0.9 g/cm$^3$, advantageously between 0.86 and 0.90 g/cm$^3$.

Advantageously, the ULDPE polyethylene comprises grafted polar functional groups such as acid or anhydride functional groups, for example maleic anhydride functional groups. The concentration by weight of these polar functional groups in the ULDPE polyethylene can vary within wide limits. For example, this concentration may be between 0.016 and 0.8% by weight relative to the weight of polyethylene. These ULDPE copolymers have been known for many years, as have the processes for manufacturing them. They are, in particular, sold by ENICHEM under the brand "Clearflex CH GO".

Copolymers grafted with polar functional groups such as maleic anhydride are also known, and described in particular in European patent applications No. 0581360 and No. 0 646 247.

The concentration of impact-strength or impact modifier compound in the composition depends, in particular, on the desired level of impact strength. This concentration is preferentially between 10 and 50% by weight of the polyamide matrix, preferably between 20 and 40%.

The compositions suitable for forming the external layer and the external-type intermediate layers are, in particular, those described in European patent No. 0588253 and international application No. WO 97/12938.

The former thermoplastic copolyamide is a copolymer corresponding to those described in patents U.S. Pat. No. 5,256, 460 or EP 0588253.

Examples of preferred copolyamide which may be mentioned include the 6/6-36 copolyamides described above, or copolymers obtained from the monomers c-caprolactam, hexamethylenediamine and undecanoic diacid.

The composition forming the external layer and/or the external-type intermediate layers may comprise a first thermoplastic copolyamide of the 6/6-36 type, and second thermoplastic polyamide of the PA 6 type.

Examples of impact modifier compounds suitable for the invention include ionomers, polymers or copolymers of polyolefins comprising functional groups such as carboxylic, ester, anhydride, glycidyl or carboxylate groups such as maleic anhydride, methacrylic and acrylic acids. These functional groups are incorporated in the polyolefins by copolymerization or grafting. Other examples include the impact modifier compounds mentioned above with reference to the compositions forming the internal-type layers.

Such compounds are known in the prior art and have been described in many applications.

According to another characteristic of the invention, these polymers or copolymers comprising functional groups may be combined with other compounds which modify toughness but do not include functional groups making it possible to bond with the thermoplastic matrix. Examples of these include polymers and copolymers of olefins such as polyethylene, polypropylene, copolymers of ethylene and propylene, EPDMs, EPRs, block or hydrogenated polybutadiene styrene, and copolymers of polyolefins with vinyl acetate.

The impact modifiers preferably still comprise at least one compound comprising grafted reactive groups as described above, mixed with other ungrafted compounds.

The compositions forming the internal or external layers of the structure of the invention may also contain one or more other components. These compounds are additives which do not modify the basic characteristics of the composition, but improve its thermal stability or photostability, and for example its mould releasability.

Examples which may be mentioned thus include thermal stabilizers such as alkali-metal or copper halides, photostabilizers such as amines, hindered phenols, lubricants such as waxes and nucleating agents.

The compositions used for manufacturing the structure of the invention may of course also comprise pigments or colorants, and the other additives customarily employed in thermoplastic moulding compositions.

These compositions are prepared using the customary methods for manufacturing a mixture of polymers with other additives, by mixing the various components of the composition in the molten state, for example in single- or double-screw extruders.

Other objects, advantages and details of the invention will become more clearly apparent from the examples given below solely by way of illustration.

The improved properties of the structure of the invention are illustrated by the production of a tube with internal diameter 6 mm and external diameter 8 mm, formed by coextruding two compositions A and B to obtain a structure with two layers one on top of the other according to the invention.

EXAMPLE 1

| Composition A used to form the external layer of the tube has the following composition: | |
|---|---|
| Copolyamide 6/6-36 NYCOA 2012 ® | 70% by weight |
| Impact modifier EXXELOR VA 1803 ® (sold by EXXON, the modulus being less than 100 MPa) | 30% by weight |
| Composition B, forming the internal layers, has the following composition by weight: | |
| Polyamide 6 ($\eta$rel = 3.8) | 64.6% |
| Impact modifier (PRIMEFLEX ® AFG4W) (sold by ENICHEM and having a modulus of less than 100 MPa) | 28.0% |
| Plasticizer (N-BBSA or N-butyl benzene sulphonamide) | 7.0% |
| Antioxidant | 0.30% |
| Lubricant (calcium stearate) | 0.30% |

The external layer has a thickness of 0.3 mm, the thickness of the internal layer being 0.7 mm.

A tube with equivalent layer thickness, that is to say equal to 1 mm, is manufactured from a composition based on polyamide 12.

The properties of the two tubes were measured and reported in Table I below:

TABLE I

| | Structures | |
|---|---|---|
| Properties | Two layers A/B (according to the invention) | PA 12 monolayer (comparative) |
| StressCracking "ZnCl$_2$" test ① (hours) | >500 | >500 |
| Tensile strength at 23° C. (N/mm$^2$) | 25 | 33-27 |
| Burst pressure at 23° C. ② (bar) | 90 | 90 |
| Dimensional stability ③ in methanol at 40° C. for 72 h (%) | <1.5 | <1.5 |
| Unleaded fuel permeability ④ at 40° C. (g/m$^2$ · day) | 0.5 | 4.8 |
| Permeability at 40° C. to unleaded fuel containing 6.5% by weight ethanol (g/m$^2$ · day) | 8.8 | 17.9 |
| Permeability at 40° C. to unleaded fuel containing 4.5% by weight methanol (g/m$^2$ · day) | 15.6 | 21.5 |
| Permeability at 40° C. to the fuel standardized by RENAULT (45% toluene, 45% isooctane, 3% methanol, 7% ethanol) (g/m$^2$ · day) | 51.5 | 97.1 |
| Impact strength at low temperature (−40° C.) ⑤ | Does not break | Does not break |

The properties above were measured using standardized methods, some of which are given below.

① The "Stress Cracking" resistance in a ZnCl$_2$ solution is determined using the procedure described in international standard SAE J 844 issued in June 1963 and revised on 12 Jun. 1990. This test consists in giving a tube of inner diameter 6 mm and outer diameter 8 mm, extruded with the material to be tested, a specific radius of curvature and immersing the tube thus curved in a cool solution with 50% by weight zinc chloride for 200 hours at 24° C. After removing the tube from the solution, no cracks should be observed on its external surface.

② The burst pressure is also determined using the procedure described in standard SAE J 844 mentioned above, and consists in determining the pressure at which a tube bursts after holding the pressure for a time of from 3 to 15 seconds.

③ The elongation in methanol is measured from the extruded tubes using the following test: round metal bars of external diameter substantially equal to the internal diameter of the tubes to be tested are put inside segments of tubes with length at least equal to 300 mm, in order to prevent any deformation, for example flexing or twisting, of the tubes to be tested.

The assembly is conditioned by keeping it for 48 hours in a chamber at a temperature of 80° C. The assembly is then cooled to room temperature and the round bar is removed. The tube is then fixed on an instrument for putting and keeping the tubes in communication with a tank containing methanol. Marks are made on the tube and their position is measured. A measured amount of methanol is introduced into the tubes, this amount being kept substantially constant throughout the operation by automatic addition from the aforementioned tank. The assembly is then heated and kept at 40° C. for 72 hours. After the end of heating, the assembly returns to room temperature in 2 to 3 hours. The new position of the marks on the tube is measured. The percentage elongation in methanol is calculated by comparing the initial and final positions of the marks.

④ The permeability of the tubes manufactured is evaluated using a static method. A tube specimen with a length of 300 mm is closed at one of its ends using a NYLON plug covered with a fuel-resistant adhesive. The tube is connected by its other end to a fuel tank with a capacity of 25 cm$^3$, so as to keep the composition of the fuel in the tube constant. The tube is conditioned thermally and by fuel impregnation so as to obtain a direct measurement of its permeability. The tests are carried out at 40° C. and the diffusion is measured by the weight loss over a specific time, for example after 24 hour periods.

The permeability thus corresponds to the sample's rate of weight loss measured when the weight loss is constant for successive periods.

The fuel used is an unleaded fuel referred to as "FUEL C".

The tensile strength at break is measured using a tensile tester on tube segments having a length of 200 mm. To prevent any deformation of the tubes in the jaws of the tensile tester, round metal bars are inserted at the ends of the tubes, these bars having a length equivalent to the length of tube clamped in the jaw and a diameter substantially equal to the tubes' internal diameter.

⑤ The impact strength at −40° C. is measured using the following procedure: the equipment measures the free-fall impact of a 1 kg mass falling from a height of 400 mm onto the sample. The mass is in the form of a 27 mm diameter rod with one end having a 9 mm curvature. The specimen is fixed by its ends in a support having a bore with a shape matching the end of the mass. The lower end of the sample is located 6 mm above the bottom of the bore.

EXAMPLE 2

A tube identical to the one described in Example 1 is produced using, as composition A, a mixture comprising 70% by weight of a 6/6-36 copolyamide sold under the brand NYCOA 2012 and 30% by weight of a impact modifier sold under the name PRIMEFLEX AFG4W. Composition B is identical to the one in Example 1.

The properties of the tube are reported in Table II below:

TABLE II

| Properties | Two layers A/B (according to the invention) |
|---|---|
| Stress Cracking "ZnCl$_2$" test ① (hours) | >500 |
| Tensile strength at 23° C. (N/mm$^2$) | 23 |
| Burst pressure at 23° C. ② (bar) | 85 |
| Dimensional stability ③ in methanol at 40° C. for 72 h (%) | <1.5 |
| Unleaded fuel permeability ④ at 40° C. (g/m$^2$ · day) | 0.5 |
| Impact strength at low temperature (−40° C.) | Does not break |

EXAMPLE 3

In the same way as in Example 1, a bilayer tube is produced using the following compositions A and B:

| Composition A: | |
|---|---|
| Copolyamide 6/6-36 NYCOA 2012 ® | 70% by weight |
| Impact modifier EXXELOR VA 1803 ® (sold by EXXON, the modulus being less than 100 MPa) | 30% by weight |
| Composition B: | |
| Polyamide 6 (ηrel = 3.8) | 66.4% |
| Impact modifier (EXXELOR ® VA 1801) (sold by EXXON, the modulus being less than 100 MPa) | 25.0% |
| Plasticizer (N-BBSA or N-butyl benzene sulphonamide) | 8.0% |
| Antioxidant | 0.30% |
| Lubricant (calcium stearate) | 0.30% |

The properties of the tube are reported in Table III below:

TABLE III

| Properties | Two layers A/B (according to the invention) |
|---|---|
| Stress Cracking "ZnCl$_2$" test ① (hours) | >500 |
| Tensile strength at 23° C. (N/mm$^2$) | 30 |
| Burst pressure at 23° C. ② (bar) | 95 |
| Dimensional stability ③ in methanol at 40° C. for 72 h (%) | <1.5 |
| Unleaded fuel permeability ④ at 40° C. (g/m$^2$ · day) | 0.3 |
| Impact strength at low temperature (−40° C.) | Does not break |

EXAMPLE 4

In the same way as in Example 1, a bilayer tube is produced using the following compositions A and B:

| Composition A: | |
|---|---|
| Copolyamide 6/6-36 NYCOA 2012 ® | 70% by weight |
| Impact modifier (EXXELOR ® VA 1801) | 30% by weight |
| Composition B: | |
| Polyamide 6 (ηrel = 3.8) | 66.4% |
| Impact modifier (EXXELOR ® VA 1801) | 25.0% |
| Plasticizer (N-BBSA or N-butyl benzene sulphonamide) | 8.0% |
| Antioxidant | 0.30% |
| Lubricant (calcium stearate) | 0.30% |

The properties of the tube are reported in Table IV below:

TABLE IV

| Properties | Two layers A/B (according to the invention) |
|---|---|
| Stress Cracking "ZnCl$_2$" test ① (hours) | >500 |
| Tensile strength at 23° C. (N/mm$^2$) | 30 |
| Burst pressure at 23° C. ② (bar) | 95 |
| Dimensional stability ③ in methanol at 40° C. for 72 h (%) | <1.5 |
| Unleaded fuel permeability ④ at 40° C. (g/m$^2$ · day) | 0.3 |
| Impact strength at low temperature (−40° C.) | Does not break |

EXAMPLE 5

In the same way as in Example 1, a bilayer tube is produced using the following compositions A and B:

| Composition A: | |
|---|---|
| Copolyamide 6/6-36 NYCOA 2012 ® | 70% by weight |
| Impact modifier EXXELOR VA 1801 ® | 30% by weight |
| Composition B: | |
| Polyamide 6 (ηrel = 3.8) | 66.4% |
| Impact modifier (EXXELOR ® VA 1803) | 25.0% |
| Plasticizer (N-BBSA or N-butyl benzene sulphonamide) | 8.0% |
| Antioxidant | 0.30% |
| Lubricant (calcium stearate) | 0.30% |

The properties of the tube are reported in Table V below:

TABLE V

| Properties | Two layers A/B (according to the invention) |
|---|---|
| Stress Cracking "ZnCl$_2$" test ① (hours) | >500 |
| Tensile strength at 23° C. (N/mm$^2$) | 30 |
| Burst pressure at 23° C. ② (bar) | 95 |
| Dimensional stability ③ in methanol at 40° C. for 72 h (%) | <1.5 |
| Unleaded fuel permeability ④ at 40° C. (g/m$^2$ · day) | 0.3 |
| Impact strength at low temperature (−40° C.) | Does not break |

The invention claimed is:

1. A tubular or pipe multilayer structure comprising at least one internal layer and an external layer, wherein the tubular or pipe multilayer structure has an opening at each end thereof, wherein the external layer is the outermost layer of the multilayer structure, wherein at least the internal layer is formed from a composition consisting of at least one thermoplastic polyamide and at least one impact-resistance modifier that is a polyolefin, the at least one impact-resistance modifier being present at a concentration by weight of between 10 and 50% of said composition, and in that at least the external layer is formed from a composition comprising as a polymer matrix a polyamide composition comprising:

(i) a polyamide thermoplastic copolymer obtained by copolymerization of E-caprolactam, and a mixture of hexamethylenediamine with a diacid comprising at least 9 carbon atoms,
the ratio by weight between the ϵ-caprolactam and the total amount of hexamethylenediamine and diacid being between 4 and 9, or (ii) a mixture of at least said thermoplastic polyamide copolymer (i) and at least one second thermoplastic polyamide or copolyamide obtained by polymerization of monomers comprising fewer than 9 carbon atoms, the content by weight of the second thermoplastic polyamide or copolyamide in the polymer matrix being between 0 and 80% by weight, wherein the at least one internal layer is in direct contact with the external layer.

2. Structure according to claim 1, wherein the composition forming the external layer comprises an impact-resistance modifier.

3. Structure according to claim 2, wherein the content of impact-resistance modifier present in the external layer when the polymer matrix is formed by the mixture (ii) is between 5% and 50% by weight of the thermoplastic composition forming the layer.

4. Structure according to claim 1, wherein the composition forming the external layer comprises a first 6/6-36 thermoplastic copolyamide and a second PA 6 thermoplastic polyamide.

5. Structure according to claim 1, wherein the composition forming the external layer comprises an impact-resistance modifier, optionally comprising functional groups which can react with the polyamide or polyamides.

6. Structure according to claim 1, wherein the composition forming the internal layer has a flexural modulus of less than 1500 MPa.

7. Structure according to claim 1, wherein the composition forming the internal layer comprises a chain extender for the polyamide matrix, which is present at a concentration by weight of between 0.05% and 5% of the polyamide matrix.

8. Structure according to claim 1, wherein the impact-resistance modifier contained in the composition forming the internal layer comprises a compound having a Tg below 0° C. and a modulus of less than 200 Mpa.

9. Structure according to claim 8, wherein at least one impact-resistance modifier comprises polar functional groups capable of reacting with the polyamide matrix.

10. Structure according to claim 9, wherein the polar functional groups are selected from the group consisting of acid, anhydride, acrylic, methacrylic and epoxy functional groups.

11. Structure according to claim 1, wherein the impact-resistance modifier is an ultra-low-density polyethylene having a density of less than 0.9 g/cm$^3$ and a melt flow index of between 0.1 and 7 g/10 min measured at 190° C. under a load of 2.16 kg.

12. Structure according to claim 1, wherein the stress cracking resistance of the structure measured in a ZnCl$_2$ solution according to international standard SAE J 844 is greater than 500 hours.

13. Structure according to claim 1, wherein a thickness of the external layer is less than 0.1 mm.

14. Structure according to claim 1, wherein a thickness of the external layer is less than 10% of the total thickness of the structure.

15. Structure according to claim 1, wherein the structure consists of one external layer and one internal layer.

16. Structure according to claim 1, wherein the external layer is formed from a composition consisting of as a polymer matrix a polyamide composition consisting of (i) or (ii).

* * * * *